(12) United States Patent
Takagi et al.

(10) Patent No.: US 9,176,925 B2
(45) Date of Patent: Nov. 3, 2015

(54) NON-TRANSITORY COMPUTER-READABLE STORAGE MEDIUM STORING GAME PROGRAM, AND INFORMATION PROCESSING DEVICE

(71) Applicant: DeNA Co., Ltd., Tokyo (JP)

(72) Inventors: Yuzo Takagi, Tokyo (JP); Takehiro Kusano, Tokyo (JP); Satoshi Sekiguchi, Tokyo (JP); Wataru Takahashi, Tokyo (JP); Yuuki Abe, Tokyo (JP); Minehiro Nagata, Tokyo (JP)

(73) Assignee: DeNa Co., Ltd., Tokyo (JP)

( * ) Notice: Subject to any disclaimer, the term of this patent is extended or adjusted under 35 U.S.C. 154(b) by 101 days.

(21) Appl. No.: 13/734,636

(22) Filed: Jan. 4, 2013

(65) Prior Publication Data

US 2013/0324265 A1 Dec. 5, 2013

(30) Foreign Application Priority Data

May 31, 2012 (JP) ................................ 2012-124765

(51) Int. Cl.
*A63F 13/00* (2014.01)
*G06F 17/00* (2006.01)
*A63F 13/30* (2014.01)

(52) U.S. Cl.
CPC ............... *G06F 17/00* (2013.01); *A63F 13/12* (2013.01); *A63F 2300/406* (2013.01); *A63F 2300/5533* (2013.01)

(58) Field of Classification Search
CPC ......... A63F 13/30; A63F 13/34; A63F 13/45; A63F 13/56; A63F 2300/408; A63F 2300/5546; A63F 2300/556; A63F 2300/5566
USPC ................................................ 463/29, 42, 43
See application file for complete search history.

(56) References Cited

U.S. PATENT DOCUMENTS

| | | | |
|---|---|---|---|
| 2003/0102956 A1* | 6/2003 | McManus et al. | 340/5.2 |
| 2007/0233291 A1* | 10/2007 | Herde et al. | 700/91 |
| 2011/0244964 A1* | 10/2011 | Glynne-Jones et al. | 463/40 |
| 2012/0311504 A1* | 12/2012 | van Os et al. | 715/853 |

* cited by examiner

*Primary Examiner* — James S McClellan
(74) *Attorney, Agent, or Firm* — Rothwell, Figg, Ernst & Manbeck, P.C.

(57) ABSTRACT

A non-transitory computer-readable storage medium storing a game program, the game program causing a computer to execute a process, including: an event occurrence process to cause occurrence of an event for allowing a player to obtain an item; an occurrence count acquisition process to acquire the number of times the event has occurred; a number determination process to determine the number of other players different from the player based on the number of times the event has occurred; and a consecutive event occurrence process to cause an event for allowing players to obtain an item to occur in a consecutive manner after the event for allowing the player to obtain the item, the number of the players being the determined number or less.

6 Claims, 14 Drawing Sheets

| CARD ID | CHARACTER NAME | LEVEL | ATTACK POWER | DEFENSE POWER | HIT POINT |
|---|---|---|---|---|---|
| 0001 | WARRIOR A | LV.5 | 500 | 500 | 1000 |
| ⋮ | ⋮ | ⋮ | ⋮ | ⋮ | ⋮ |
| 0100 | WIZARD X | LV.15 | 2000 | 2000 | 8000 |
| ⋮ | ⋮ | ⋮ | ⋮ | ⋮ | ⋮ |
| 0105 | MARTIAL ARTIST Y | LV.16 | 1000 | 1000 | 6000 |
| ⋮ | ⋮ | ⋮ | ⋮ | ⋮ | ⋮ |

| CARD ID | CHARACTER NAME | LEVEL | ATTACK POWER | DEFENSE POWER | HIT POINT |
|---|---|---|---|---|---|
| 0001 | WARRIOR A | LV.5 | 500 | 500 | 1000 |
| ⋮ | ⋮ | ⋮ | ⋮ | ⋮ | ⋮ |
| 0100 | WIZARD X | LV.15 | 2000 | 2000 | 8000 |
| ⋮ | ⋮ | ⋮ | ⋮ | ⋮ | ⋮ |
| 0105 | MARTIAL ARTIST Y | LV.16 | 1000 | 1000 | 6000 |
| ⋮ | ⋮ | ⋮ | ⋮ | ⋮ | ⋮ |

FIG. 4

| USER ID | FRIEND USER ID | VIRTUAL CURRENCY | OWNED CARD INFORMATION | NUMBER OF OCCURRENCES OF CONSECUTIVE EVENT | EVENT NOTIFIER INFORMATION |
|---|---|---|---|---|---|
| 1 | 5, 8 | 0 | OWNED CARD INFORMATION(1) | NONE | NONE |
| 2 | NONE | 500 | OWNED CARD INFORMATION(2) | NONE | NONE |
| 3 | 4, 6 | 700 | OWNED CARD INFORMATION(3) | NONE | NONE |
| 4 | 3, 6 | 1000 | OWNED CARD INFORMATION(4) | 2 | 3 |
| 5 | 1, 6 | 100 | OWNED CARD INFORMATION(5) | NONE | NONE |
| 6 | 3, 4, 5 | 3000 | OWNED CARD INFORMATION(6) | 3 | 5 |
| . | . | . | . | . | . |
| . | . | . | . | . | . |
| . | . | . | . | . | . |

FIG. 5

| OWNED CARD INFORMATION (1) | | | | | |
|---|---|---|---|---|---|
| OWNED CARD ID | LEVEL | ATTACK POWER | DEFENSE POWER | HIT POINT | ACQUISITION DATE/TIME |
| 0011 | LV. 3 | 15 | 10 | 200 | 2012/2/13 10:00 |
| 0211 | LV. 4 | 20 | 23 | 150 | 2012/2/13 12:00 |
| 0133 | LV. 1 | 70 | 45 | 100 | 2012/2/14 11:30 |
| 0201 | LV. 4 | 22 | 40 | 600 | 2012/2/15 18:00 |
| 0072 | LV. 7 | 60 | 50 | 250 | 2012/2/16 13:30 |
| 0094 | LV. 1 | 300 | 200 | 450 | 2012/2/16 19:00 |
| ... | ... | ... | ... | ... | ... |

FIG. 6

| ITEM ID | ITEM NAME | DEGREE OF RARENESS | PRICE |
|---|---|---|---|
| 001 | ARMAMENT A | 1 | 1000 |
| 002 | MEDICINAL PLANT B | 5 | 200 |
| 003 | TECHNIQUE C | 3 | 5000 |
| ⋮ | ⋮ | ⋮ | ⋮ |

FIG. 7

| EVENT ID | EVENT TYPE | EVENT SUCCESS RATE | PROVIDED ITEM ID | EVENT OCCURRENCE PROBABILITY |
|---|---|---|---|---|
| 001 | APPEARANCE OF CHARACTER A | 20% | 001, 002, ... | 50% |
| 002 | APPEARANCE OF CHARACTER B | 5% | 010, 015, ... | 10% |
| 003 | APPEARANCE OF CHARACTER C | 10% | 025, 041, ... | 10% |
| ... | ... | ... | ... | ... |

FIG. 8

APPEARANCE OF CHARACTER C (EVENT ID:003)
APPEARANCE OF CHARACTER B (EVENT ID:002)
APPEARANCE OF CHARACTER A (EVENT ID:001)

| NUMBER OF EVENT REPETITIONS | NUMBER OF PLAYERS | PROBABILITY |
|---|---|---|
| 1 | 0 | 0% |
| 1 | 1 | 33.3% |
| 1 | 2 | 33.3% |
| 1 | 3 | 33.3% |
| 1 | 4 | 0% |
| 1 | 5 | 0% |
| 2 | 0 | 0% |
| 2 | 1 | 100% |
| 2 | 2 | 0% |
| 2 | 3 | 0% |
| 2 | 4 | 0% |
| 2 | 5 | 0% |
| 3 | 0 | 0% |
| ⋮ | ⋮ | ⋮ |

FIG. 9

NON-TRANSITORY COMPUTER-READABLE STORAGE MEDIUM STORING GAME PROGRAM, AND INFORMATION PROCESSING DEVICE

CROSS-REFERENCE TO RELATED APPLICATIONS

The present application claims priority upon Japanese Patent Application No. 2012-124765 filed on May 31, 2012, which is herein incorporated by reference.

BACKGROUND

1. Technical Field

This invention relates to a non-transitory computer-readable storage medium storing a game program, and an information processing device.

2. Related Art

A game program is known that causes a computer to execute a game for distributing an item from one player to another.

In such a game program, there is a possibility that distribution of an item increases due to successive occurrences of the opportunity where a plurality of players can obtain the item. This lowers the level of difficulty of a game, thereby making players lose interest in the game.

SUMMARY OF THE INVENTION

The present invention has been made in view of the above issue, and it is an advantage thereof to suppress the distribution of an item.

As aspect of the invention to solve the above problem is a non-transitory computer-readable storage medium storing a game program, the game program causing a computer to execute a process, including:
  an event occurrence process to cause occurrence of an event for allowing a player to obtain an item;
  an occurrence count acquisition process to acquire the number of times the event has occurred;
  a number determination process to determine the number of other players different from the player based on the number of times the event has occurred; and
  a consecutive event occurrence process to cause an event for allowing players to obtain an item to occur in a consecutive manner after the event for allowing the player to obtain the item, the number of the players being the determined number or less.

Other features of this invention will become apparent from the description in this specification and the attached drawings.

BRIEF DESCRIPTION OF DRAWINGS

FIG. 4 illustrates an example of a data structure of card information.

FIG. 5 illustrates an example of a data structure of user information.

FIG. 6 illustrates an example of a data structure of owned card information.

FIG. 7 illustrates an example of a data structure of item information.

FIG. 8 illustrates an example of a data structure of event information.

FIG. 9 illustrates an example of a data structure of number determination information.

DESCRIPTION OF EMBODIMENTS

Figure 1:
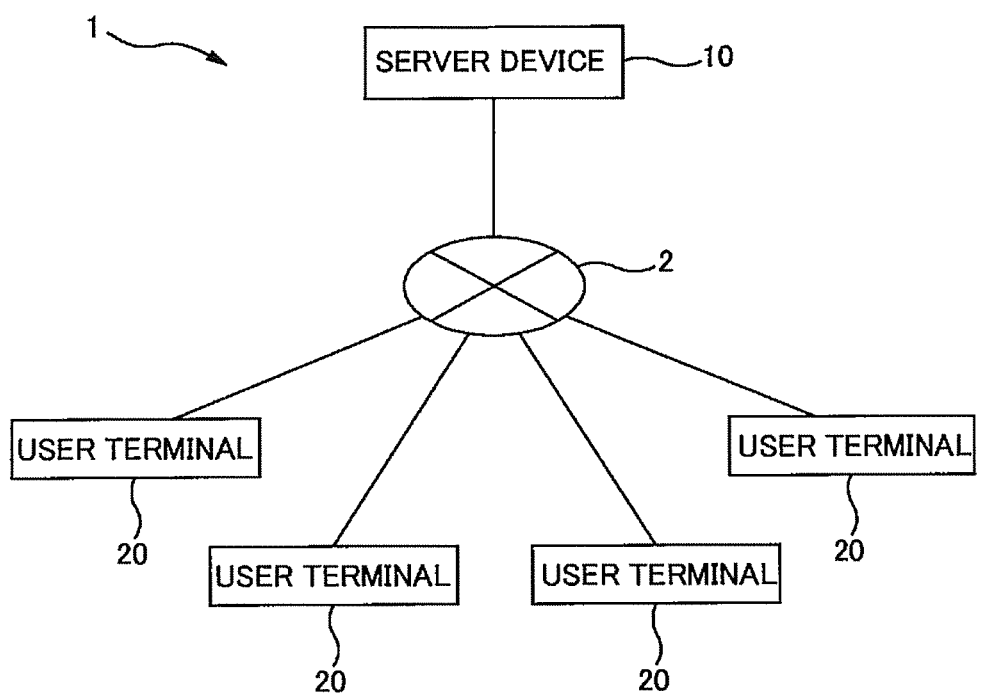
FIG. 1 is an example of an overall configuration of a game system 1 according to the present embodiment.

With the description and the accompanied drawings, at least the following matters will be apparent.

A non-transitory computer-readable storage medium storing a game program, the game program causing a computer to execute a process, including:
  an event occurrence process to cause occurrence of an event for allowing a player to obtain an item;
  an occurrence count acquisition process to acquire the number of times the event has occurred;
  a number determination process to determine the number of other players different from the player based on the number of times the event has occurred; and
  a consecutive event occurrence process to cause an event for allowing players to obtain an item to occur in a consecutive manner after the event for allowing the player to obtain the item, the number of the players being the determined number or less.

According to such a game program, the number of other players is determined based on the number of times an event has occurred, and therefore the distribution of an item can be suppressed.

In such a game program, the game program may cause the computer to execute, in the number determination process, a process to determine the number of other players in accordance with a type of the event for allowing the player to obtain the item.

According to such a game program, the distribution of an item can be suppressed in accordance with the type of an event.

In such a game program, the game program may cause the computer to
  execute a reception process to receive inputs from the player for selecting the other players, the number of the inputs being smaller than or equal to the number determined in the number determination process, and
  in the consecutive event occurrence process, cause an event for allowing the other players selected by the player to obtain an item to occur in a consecutive manner after the event for allowing the player to obtain the item.

According to such a game program, an item is limited to being distributed to other players selected by a player.

In such a game program, when the consecutive event occurrence process has caused consecutive occurrence of the event for allowing the other players to obtain the item, the game program may cause the computer to execute a message sending process to send a message from the other players to the player.

According to such a game program, communication between players can be activated.

In such a game program, the game program may cause the computer to execute a judgment process to judge whether the event that has been caused to occur in the event occurrence process succeeds or fails; and a provision process to provide the item to the player when the judgment process has judged that the event succeeds.

According to such a game program, an item is provided only when an event succeeds, and therefore the distribution of the item can be suppressed.

Moreover, an information processing device including:

an event occurrence unit that causes occurrence of an event for allowing a player to obtain an item;

an occurrence count acquisition unit that acquires the number of times the event has occurred;

a number determination unit that determines the number of other players different from the player based on the number of times the event has occurred; and a consecutive event occurrence unit that causes an event for allowing players to obtain an item to occur in a consecutive manner after the event for allowing the player to obtain the item, the number of the players being the determined number or less.

According to such an information processing device, the number of other players is determined based on the number of times an event has occurred, and therefore the distribution of an item can be suppressed.

Present Embodiment

<<<Configuration of Game System 1>>>

FIG. 1 is an example of an overall configuration of a game system 1 according to the present embodiment. The game system 1 according to the present embodiment provides various types of services related to games to a user who has been registered as a member (also referred to as "player") over a network 2. The user can play a game transmitted over the network 2 by accessing the game system 1. The user can also register other users as friends on a friend list by accessing the game system 1. In this way, the game system 1 encourages communication between a plurality of users by allowing the users to play games and exchange messages with users who have become friends.

The game system 1 according to the present embodiment includes a server device 10 and a plurality of user terminals 20 (also referred to as "player terminals"). The server device 10 and the user terminals 20 are each connected to the network 2 and are able to communicate with each other. The network 2 is, for example, the Internet, a local area network (LAN), or a value added network (VAN) established by Ethernet (registered trademark) or a public telephone line network, a wireless network, or a mobile telephone network.

The server device 10 is an information processing device used by, for example, a system administrator when managing and controlling the game service. The server device 10 is, for example, a workstation or personal computer and is able to distribute various types of information to the user terminals 20 in response to various commands (requests) transmitted from those user terminals 20. When a distribution request for game contents is received from a user terminal 20 used by a user playing a game, the server device 10 according to the present embodiment is able to distribute the game contents, such as a game program that is operable on the user terminal 20, in accordance with the request, and a web page and the like generated by a mark-up language (HTML, and the like) suited to the standards of the user terminal.

The user terminal 20 is an information processing device used by a user when playing a game. The user terminal 20 may be, for example, a mobile telephone terminal, a smartphone, a personal computer, or a game device and the like, and is able to send a distribution request for various types of information (e.g., game contents such as game programs and web pages) related to the game to the server device 10 that is accessible over the network 2. The user terminals 20 also have a web browser function for allowing users to view web pages. Therefore, when web pages (e.g., game play images) linked to, for example, image data related to a game are distributed from the server device 10, the user terminals 20 are able to display the web pages on screens.

<<<Configuration of Server Device 10>>>

Figure 2:
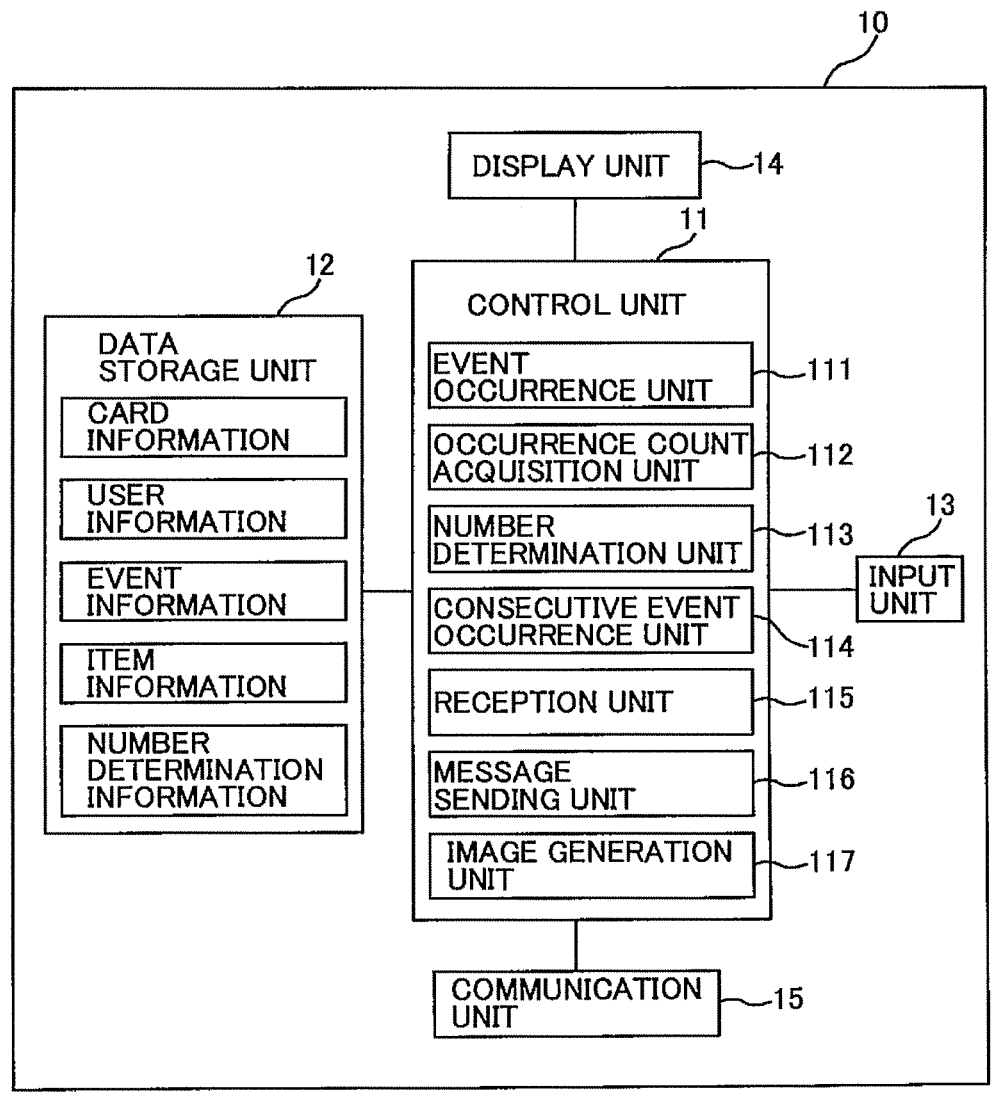
FIG. 2 is a block diagram of a functional configuration of a server device 10 according to the present embodiment.

FIG. 2 is a block diagram of a functional configuration of a server device 10. The server device 10 according to the present embodiment includes a control unit 11, a data storage unit 12, an input unit 13, a display unit 14, and a communication unit 15.

The control unit 11 is a unit that transfers data among the units and controls the entire server device 10, and is realized by a central processing unit (CPU) executing a program stored in a predetermined memory. Specifically, the control unit 11 has a function to execute various controls and information processes related to the game system 1 such as various processes to provide a game service and various processes to address requests from the user terminals 20. More specifically, as illustrated in FIG. 2, the control unit 11 according to the present embodiment includes an event occurrence unit 111, an occurrence count acquisition unit 112, a number determination unit 113, a consecutive event occurrence unit 114, a reception unit 115, a message sending unit 116, and an image generation unit 117.

The event occurrence unit 111 has a function to perform a process for causing occurrence of an event for allowing a player to obtain an item. Specifically, the event occurrence unit 111 selects a certain event with a predetermined probability from among a plurality of types of events that have been set in advance, and causes occurrence of the selected event.

The occurrence count acquisition unit 112 has a function to perform a process for acquiring the number of times the event occurrence unit 111 has caused an event to occur. Specifically, when the event occurrence unit 111 has caused occurrence of an event, the occurrence count acquisition unit 112 identifies how many times this event has occurred by reading the number of times this event has occurred from a memory.

The number determination unit 113 has a function to perform a process for determining the number of other players different from the player for whom the event occurrence unit 111 has caused the event to occur based on the number of times the event has occurred which has been determined by the occurrence count acquisition unit 112.

The consecutive event occurrence unit 114 has a function to perform a process for causing an event for allowing other players, the number of whom has been determined by the number determination unit 113, to acquire the item to occur in a consecutive manner after the event that the event occurrence unit 111 caused to occur.

The reception unit 115 has a function to perform a process for receiving operational inputs from players. Specifically, the reception unit 115 is able to receive operational inputs from players by the server device 10 receiving operational information (e.g., commands) input by the players using the user terminals 20 over a network.

The message sending unit 116 has a function to perform a message sending process for sending a message from other players for whom the consecutive event occurrence unit 114 has caused consecutive occurrence of the event, to the player for whom the event occurrence unit 111 has caused occurrence of the event.

The image generation unit 117 has a function to perform a process for generating a task image that allows players to play a game and various types of image data such as game images and event images including a character and the like. Screen transitions according to the present embodiment will be described later in detail.

The data storage unit 12 has a read only memory (ROM) that is a read-only storage region in which system programs for the server device 10 are stored, and a random access memory (RAM) that is a rewritable storage region in which various types of data (flags and computed values used by the system program) generated by the control unit 11 are stored and which is used as a work area for computing processes performed by the control unit 11. The data storage unit 12 is realized, for example, by a non-volatile storage device such as a flash memory or a hard disk and the like. The data storage unit 12 according to the present embodiment stores card information related to game cards used by the users in a game, user information related to the users, event information related to events, item information related to items, and number determination information for determining the number of other players. These pieces of information will be described later in detail.

The input unit 13 is a unit for a system administrator and the like to input various types of data (e.g., the below mentioned card information, event information, item information and number determination information), and is realized by a keyboard, a mouse, and the like.

The display unit 14 is a unit which displays operating screens for the system administrator on the basis of commands from the control unit 11, and is realized, for example, by a liquid crystal display (LCD) and the like.

The communication unit 15 is a unit for performing communication with the user terminals 20, and has a function as a reception unit for receiving signals and various types of data transmitted from the user terminals 20, and a function as a transmission unit for transmitting the signals and various types of data to the user terminals 20 in accordance with commands from the control unit 11. The communication unit 15 is realized, for example, by a network interface card (NIC) and the like.

<<<Configuration of User Terminal 20>>>

Figure 3:
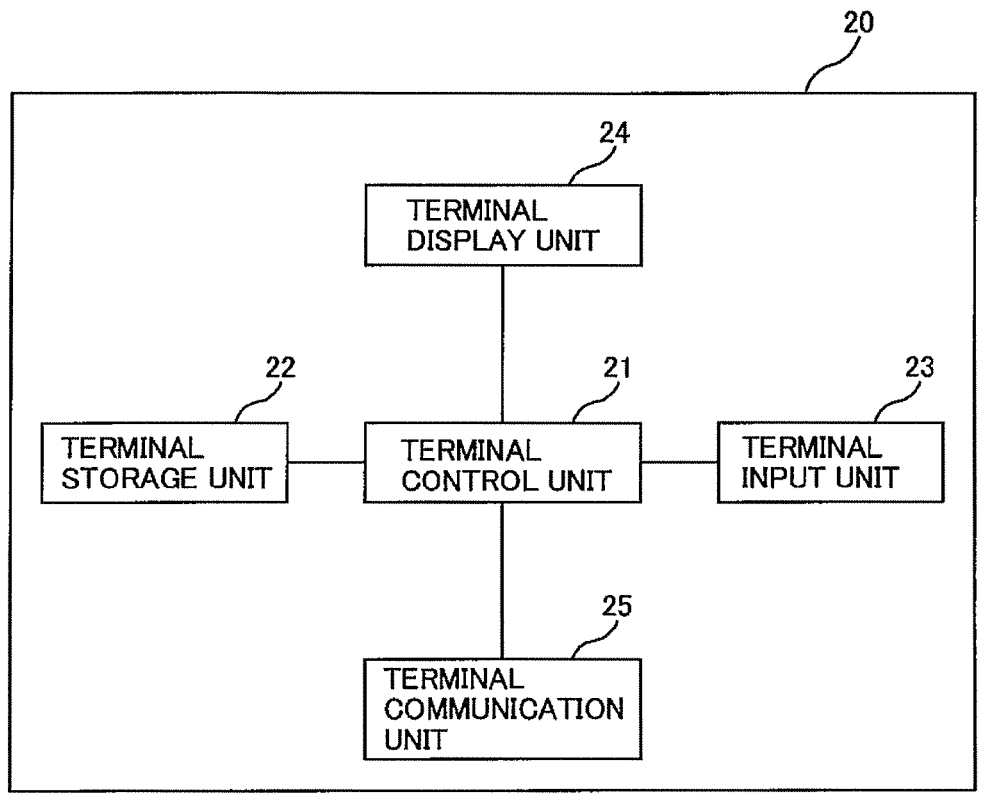
FIG. 3 is a block diagram of a functional configuration of a user terminal 20 according to the present embodiment.

FIG. 3 is a block diagram of a functional configuration of a user terminal 20. The user terminal 20 according to the present embodiment includes a terminal control unit 21, a terminal storage unit 22, a terminal input unit 23, a terminal display unit 24, and a terminal communication unit 25.

The terminal control unit 21 is a unit that transfers data among the units and controls the entire user terminal 20, and is realized by a central processing unit (CPU) executing a program stored in a predetermined memory. Specifically, the terminal control unit 21 has functions to execute various controls and information processes related to the game system 1 such as various processes for accessing a game site, and various processes for sending requests to the server device 10.

The terminal storage unit 22 has a read only memory (ROM) that is a read-only storage region in which system programs for the user terminal 20 are stored, and a random access memory (RAM) that is a rewritable storage region in which various types of data (flags and computed values used by the system program) generated by the terminal control unit 21 are stored and which is used as a work area for computing processing by the terminal control unit 21. The terminal storage unit 22 is realized, for example, by a non-volatile storage device such as a flash memory or a hard disk and the like. The terminal storage unit 22 is connected to the terminal control unit 21 through a bus, and the data stored in the terminal storage unit 22 is looked up, read, and rewritten in accordance with commands from the terminal control unit 21. In the present embodiment, game contents such as user IDs, and game programs and game data transmitted from the server device 10 and the like are recorded in the terminal storage unit 22.

The terminal input unit 23 is a unit with which the user performs various operations (game operations, text input operations, and the like), and is realized, for example, by an operating button or a touch panel and the like.

The terminal display unit 24 is a unit for displaying a game screen (game play image) generated on the basis of game information based on commands from the terminal control unit 21, and is realized, for example, by a liquid crystal display (LCD) and the like.

The terminal communication unit 25 is a unit that performs communication with the server device 10, and has a function as a reception unit for receiving signals and various data transmitted from the server device 10, and a function as a transmission unit for transmitting the signals and various data to the server device 10 in accordance with commands from the terminal control unit 21. The terminal communication unit 25 is realized, for example, by a network interface card (NIC) and the like.

<<<Game Outline>>>

A description is now given of an outline of the game provided by the game system 1.

The game system 1 according to the present embodiment is able to provide users (players) with a battle game that is played using a game medium. The following describes a battle-type card game that is played using a game card as one example of the game medium. Note that this game card serves as digital content, namely a virtual card used in a virtual space in the game.

<Battle-Type Card Game>

The game system 1 according to the present embodiment is able to provide a battle-type card game that determines an outcome by allowing a character selected by a player to battle against an opposing character, i.e. an adversary.

In this battle-type card game, the player first selects a character to battle against the opposing character. In the present embodiment, the player is able to own a plurality of game cards (virtual cards used in a virtual space in the game). The game cards are each associated with a game character. Thus, when the player selects a game card to be used in the battle from the game cards that the player owns, the character associated with the selected game card is set as the character (hereinafter referred to as "player character") to battle against the opposing character.

Next, a battle game is started in which the player character selected by the user battles against the opposing character. In the present embodiment, the setting is such that, when a player finds an opposing character through a search, the battle game is started by causing the opposing character to appear as an adversary against the player character. Furthermore, the setting is such that, during the search conducted by the player, the after-mentioned event occurs with suspension of the game.

When the battle against the opposing character that has appeared is started, the player inputs a command to perform an attack. Then, the player character attacks the opposing character in accordance with the input command, and the opposing character performs a counter-attack to resist the attack. The determination of the outcome in the battle game in the present embodiment is evaluated on the basis of a life parameter (hit point parameter) set for each character. The battle game is programmed so that as the value of the life parameter (hit point parameter) is reduced in accordance with the attack power of an adversary, either the character whose value reaches zero first or the character whose value remaining at the end of a battle time period is smaller is defeated.

Furthermore, the battle-type card game according to the present embodiment may be a multiplayer battle game in which a plurality of players participate. More specifically, an opposing character that is common to various players is set as an adversary. Each player individually battles against the common opposing character. A value of a life parameter of the common opposing character is reduced in accordance with an attack by each player character. When the common opposing character performs a counter-attack to resist the attack, a value of a hit point parameter of each player character is reduced in accordance with the counter-attack. When the value of the life parameter of the opposing character reaches zero first, or when the remaining value of the life parameter of the opposing character is smaller than the remaining value of the hit point parameter of each player character at the end of a battle time period, each player character wins the battle against the opposing character.

At this time, a team (group) consisting of various players as members may also be formed. In this case, a battle against an adversary, i.e. an opposing character that is common to various players is performed on a per-team basis.

<Event Occurrence>

In the present battle-type card game, an event for allowing a player to obtain an item occurs during the progress of the game. An event to occur is selected by random selection from among a plurality of types of events that have been set in advance. In the present embodiment, whether or not an event succeeds or fails is determined based on an operational input from a player. Whether or not an event succeeds or fails is determined in accordance with a preset probability. A probability with which an event succeeds (or fails) varies with each type of event. Whether an event succeeds or fails may be determined without depending on an operational input from a player.

<Provision of Item>

In the present battle-type card game, an item is provided to a player when the success of an event is determined as a result of the occurrence of the event. Conversely, the item is not provided to the player when the failure of the event is determined. Note that an item gives an advantage to a player during the progress of the game. Examples of an item include a tool and an ability that can be used in the game, and a game card owned by the player.

<Consecutive Event Occurrence>

In the present battle-type card game, following an event for allowing a player to obtain an item, an event for allowing other players different from the player to obtain the item can occur consecutively. In the present embodiment, a player who has obtained an item as a result of the success of an event selects other players associated with him/herself (e.g., peer players), and causes consecutive occurrence of an event for allowing other players to obtain the item. When the player selects other players, the number of selectable players is determined based on the number of times the event has occurred (the number of chained occurrences of the event). This is because allowing unlimited selection of other players each time an event occurs consecutively leads to successive occurrences of the opportunity where a plurality of players can obtain an item, thereby increasing the distribution of the item. In view of this, in the present embodiment, the distribution of an item is suppressed by restricting the number of other players for whom an event occurs consecutively based on the number of times the event has occurred (the number of chained occurrences of the event).

Note that other players different from the player are not limited to being associated with the player as mentioned above, but may be players randomly selected by a computer without depending on a selection operation performed by the player.

<Sending Message>

In the present battle-type card game, when an event for allowing other players different from the player to obtain an item occurs consecutively, other players can send a message to the player. For example, in the present embodiment, when other players selected by the player have obtained the item through the event that has occurred consecutively, they can send a thank-you message to the player who has selected other players. In this way, communication between players can be activated.

<<<Data Structure>>>

The various types of information used in the game system 1 of the present embodiment will be described with reference to FIGS. 4 to 9. FIG. 4 illustrates an example of a data structure of card information. FIG. 5 illustrates an example of a data structure of user information. FIG. 6 illustrates an example of a data structure of owned card information. FIG. 7 illustrates an example of a data structure of item information. FIG. 8 illustrates an example of a data structure of event information. FIG. 9 illustrates an example of a data structure of number determination information. In the present embodiment, the data storage unit 12 of the server device 10 stores at least the card information, user information, owned card information, item information, event information, and number determination information.

<Card Information>

The card information includes a card ID which is one example of identification information for identifying a game card, and various types of information related to the game card associated with the card ID. For example, as illustrated in FIG. 4, the card information includes the card ID, the name of the character associated with the game card, the level of the character, and various types of parameters such as attack power, defense power, and hit point. Thus, when a game card to be used to battle against the opposing character is selected by the user (player) while a battle process is being performed, the card information (e.g., attack power and hit point) of the selected game card is reflected as a skill value set for the character corresponding to the selected game card, and the outcome of the battle game is determined.

<User Information>

The user information includes a user ID which is one example of identification information for identifying a user (player), and various types of information related to the particular user associated with the user ID. For example, as illustrated in FIG. 5, the user information includes a user ID, friend user IDs, virtual currency, owned card information, consecutive event occurrence information, and event notifier information.

Friend user IDs are information indicative of other users (players) who have been registered on a friend list of the user. That is to say, the larger the number of friend user IDs, the larger the number of other users (peer players) with whom the user have become friends. The friend user IDs are updated when the user registers other users on the friend list, and when the user deletes other users who have already been registered from the friend list.

Note that the friend users are not limited to other users selected by the user. For example, the server device 10 may sequentially select other users who serve as the friend users by selection at a predetermined time interval. Alternatively, the server device 10 may select other users as the friend users based on, for example, skill values of users.

The virtual currency is information indicative of the amount of virtual currency owned by the user (player). The virtual currency is updated when the user earns or spends virtual currency. The user can purchase an item by spending virtual currency.

The owned card information is information indicative of cards owned by the user (player). The owned card information includes owned card IDs indicative of cards owned by the user and various types of information related to the owned cards associated with the owned card IDs.

For example, as illustrated in FIG. 6, the owned card information includes the owned card IDs, the levels of characters associated with game cards with the owned card IDs, various types of parameters such as attack power and defense power, and acquisition dates and times when the user acquired the owned cards.

The levels are information indicative of the levels of the characters associated with the game cards with the owned card IDs. Various types of parameters such as attack power, defense power and hit point are data indicative of skill values set for the characters. These levels and various types of parameters such as attack power are changed and updated in accordance with the result of the battle-type card game. The acquisition dates and times are information indicative of the dates and times when the user acquired the owned cards.

The consecutive event occurrence information is information indicative of the number of times an event for allowing the user (player) to obtain an item has occurred consecutively. In the present embodiment, the consecutive event occurrence information is set to the number of repetitions of the event when event information has been notified from another user, and the consecutive event occurrence information is set to "none" when the event information has not been notified.

The event notifier information is information indicative of another user who has notified the event information to the user (player). In the present embodiment, the event notifier information is set to the user ID of another user who has notified the event when the event information has been notified from another user, and the event notifier information is set to "none" when the event information has not been notified.

<Item Information>

The item information includes an item ID which is one example of identification information for identifying an item provided to the player, and various types of information related to the item associated with the item ID. For example, as illustrated in FIG. 7, the item information includes an item ID, the name of the item associated with the item ID, and various types of parameters such as a degree of rareness of the item and the price of the item. Therefore, when the user uses an item, various types of parameters (e.g., skill value and recovery value) of this selected item are reflected, and the player can advantageously proceed with the game.

<Event Information>

The event information includes an event ID for identifying an event for allowing the player (or other players) to obtain an item, and various types of information related to the event associated with the event ID. For example, as illustrated in FIG. 8, the event information includes an event ID, an event type, an event success rate, a provided item ID, and an event occurrence probability.

The event type is information indicative of the type of each event. In the present embodiment, an event for causing the appearance of a character who provides an item is set as one example of the event type. As different event types cause different characters to appear, a wide variety of events can occur.

The event success rate is information indicative of the probability with which an event that has occurred succeeds. The success or failure of each type of event is determined in accordance with the event success rate. That is to say, as occurrence of an event does not necessarily lead to provision of an item to the player, an increase in the distribution of the item can be suppressed.

The provided item ID is an item ID of an item provided to the player when an event succeeds. In the present embodiment, an item provided to the player varies with each event type. Therefore, the player can obtain various items depending on the types of events that have occurred.

The event occurrence probability is information indicative of the probability with which an event occurs during the progress of the game. In the present embodiment, the event occurrence probability can be set for each event type. This makes it possible to set an event for causing the emergence of a character with a high appearance frequency (a character with a low degree of rareness) and an event for causing the emergence of a character with a low appearance frequency (a character with a high degree of rareness).

<Number Determination Information>

The number determination information is information for determining the number of other players when causing an event for allowing other players different from the player to obtain an item to occur in a consecutive manner after an event for allowing the player to obtain the item. As illustrated in FIG. 9, the number determination information according to the present embodiment is set for each event ID (each event type), and includes the number of repetitions of an event that has occurred (the number of times the event has occurred), the number of other players for whom an event can occur consecutively, and the probability with which this number of other players is selected. As the number of other players is determined for each event type, the distribution of an item can be suppressed for each event type.

Specifically, as illustrated in FIG. 9, in the case of an event in which character A appears (event ID: 001), when the number of repetitions is one (i.e. when the event occurs for the first time), the number of other players for whom an event can occur consecutively thereafter is determined as zero with a probability of 0%, one with a probability of 33.3%, two with a probability of 33.3%, three with a probability of 33.3%, four with a probability of 0%, and five with a probability of 0%. That is to say, when an event for allowing the player to obtain an item occurs for the first time, the number of other players for whom the second event can occur consecutively is determined as one, two, or three. When the number of repetitions is two (i.e. when the second event has occurred consecutively), the number of other players for whom an event can occur consecutively thereafter is determined as zero with a probability of 0%, one with a probability of 100%, two with a probability of 0%, three with a probability of 0%, four with a probability of 0%, and five with a probability of 0%. That is to say, when an event for allowing other players to obtain an item has occurred consecutively (for the second time), the number of other players for whom the third event can occur consecutively is determined as only one. When the number of repetitions reaches five, the number of other players is determined as zero, and the consecutive occurrences of the event are ended.

As described above, when causing an event for allowing other players different from the player to obtain an item to occur in a consecutive manner after an event for allowing the player to obtain the item, the number of other players is determined based on the number of times the event has occurred. This can restrict successive occurrences of the opportunity where a plurality of players can obtain the item, thereby suppressing an increase in the distribution of the item.

<<<Screen Transitions>>>

Figure 10:
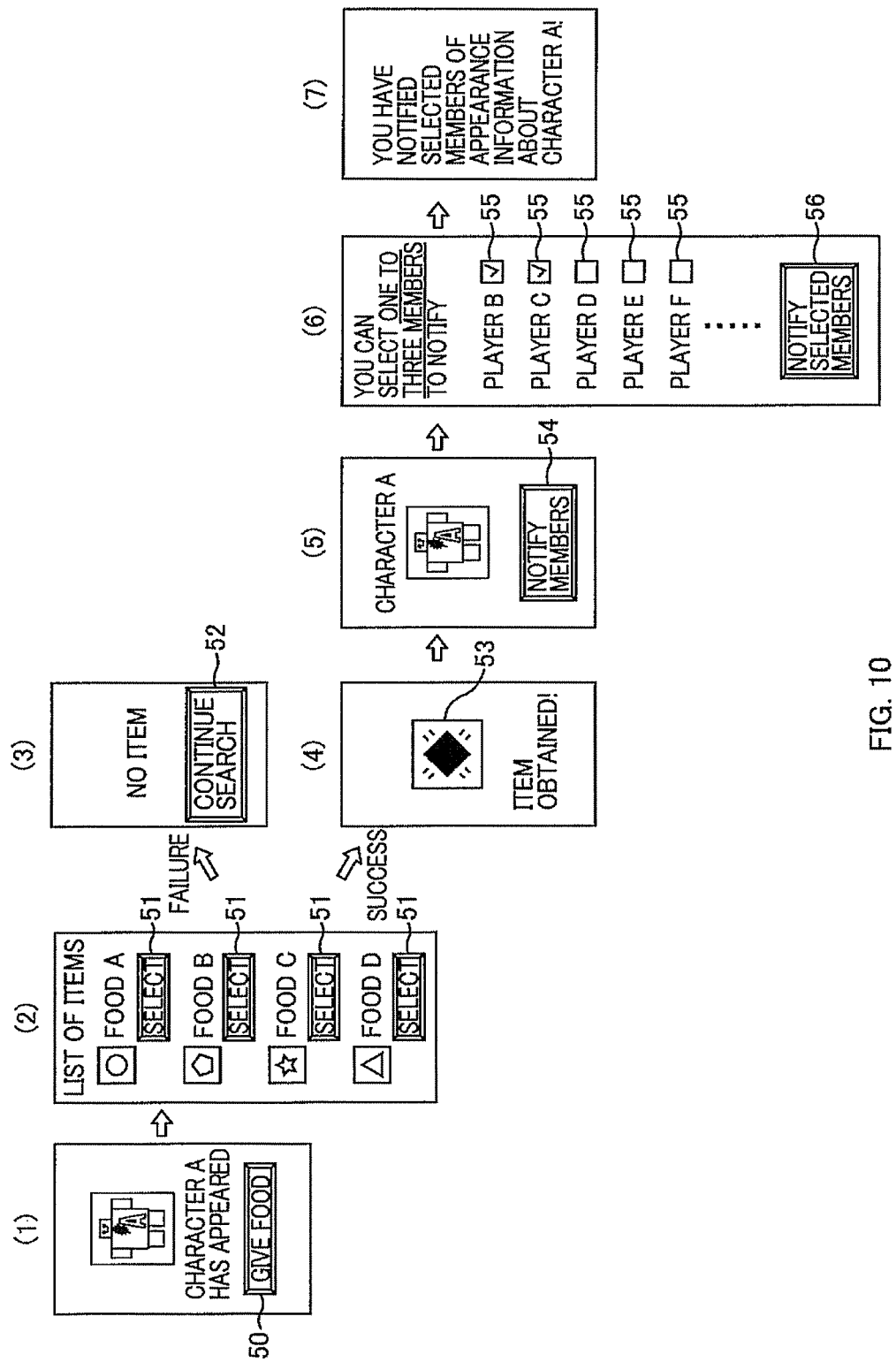
FIG. 10 shows screen transitions related to an event that has occurred for the first time.
Figure 11:
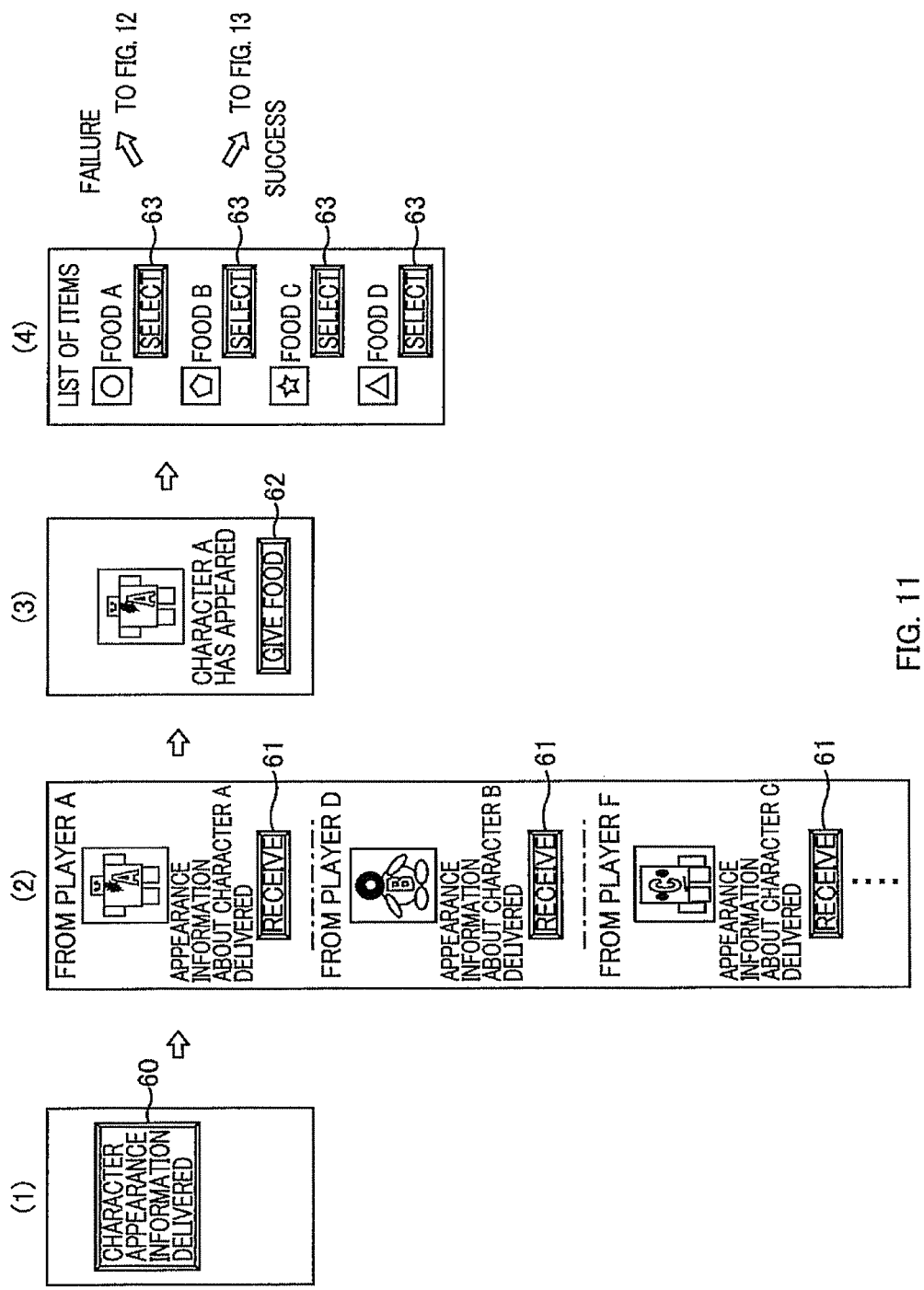
FIG. 11 shows screen transitions related to an event that has occurred consecutively.
Figure 12:
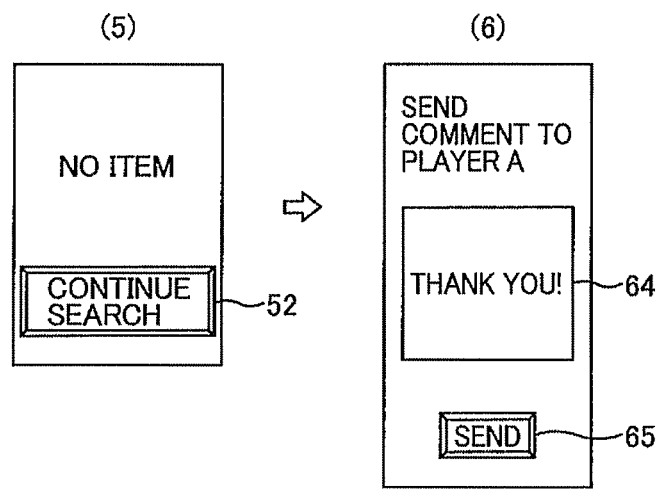
FIG. 12 shows screen transitions for the case where the event that has occurred consecutively fails.
Figure 13:
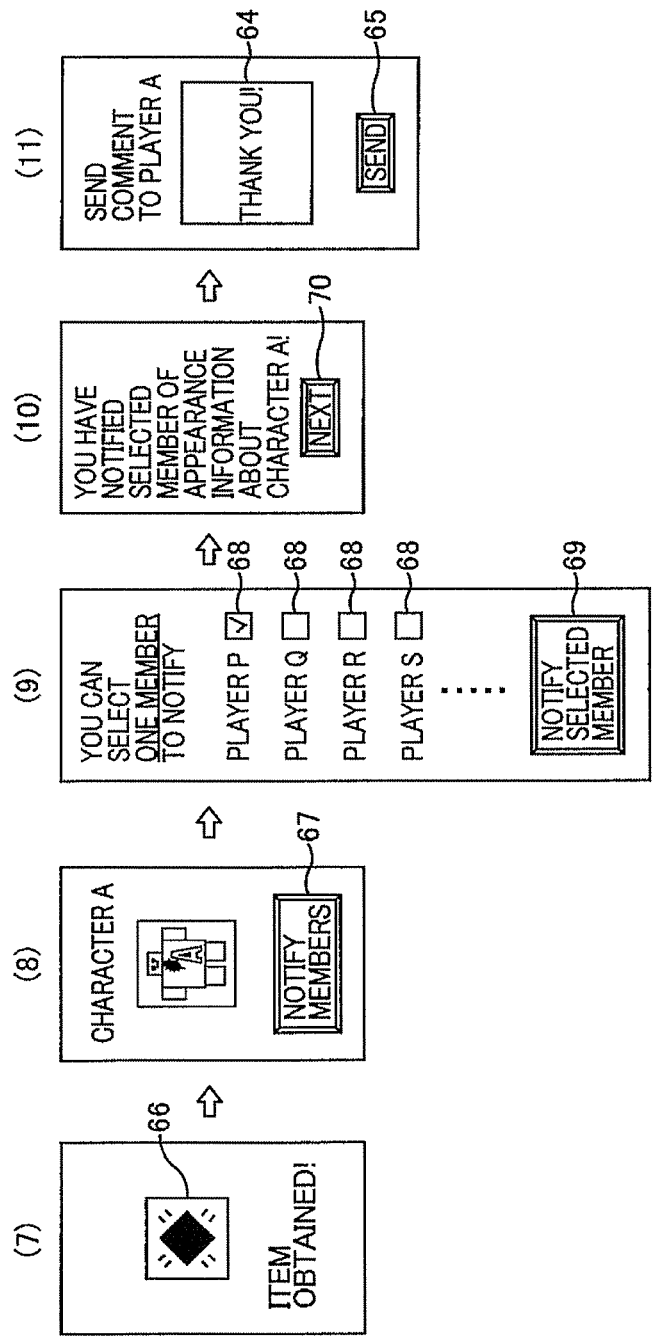
FIG. 13 shows screen transitions for the case where the event that has occurred consecutively succeeds.

The following describes screen transitions for the case where an event has occurred with reference to FIGS. 10 and 13. FIG. 10 shows screen transitions related to an event that has occurred for the first time. FIG. 11 shows screen transitions related to an event that has occurred consecutively. FIG. 12 shows screen transitions related to the case where the event that has occurred consecutively fails. FIG. 13 shows screen transitions related to the case where the event that has occurred consecutively succeeds.

Below, the description of the screen transitions for the event that has occurred consecutively is given after the description of the screen transitions for the event that has occurred for the first time.

<Screen Transitions for Event that has Occurred for the First Time>

First, a description is given of screen transitions for an event that has occurred for the first time with reference to FIG. 10. Note that the following description is given under the assumption that event screens are displayed in sequence on the terminal display unit 24 of a user terminal 20 used by a player (e.g., player A).

The player A starts a game and conducts a search using the user terminal 20. With reference to the event information illustrated in FIG. 8, the server device 10 determines whether or not to cause occurrence of an event for allowing the player A to obtain an item during the progress of the game based on the event occurrence probability. When the server device 10 determines to cause the occurrence of the event, an event image indicating that a character (e.g., character A) has appeared is generated and the generated event image is transmitted to the user terminal 20.

Upon receiving such an event image, the user terminal 20 makes the terminal display unit 24 display an event screen (1) illustrated in FIG. 10. This event screen (1) includes the name and image of the character that has appeared, and an operating button 50 for taking action toward the character that has appeared. In the present embodiment, the player A can give food to the character A that has appeared by selecting the operating button 50.

When the player A selects the operating button 50 included in the event screen (1), the user terminal 20 transmits a command to request the giving of food to the character A to the server device 10. When the server device 10 receives this command through the reception unit 115, the server device 10 makes the image generation unit 117 generate an event image including a list of items by referring to the item information illustrated in FIG. 7, and transmits the generated event image to the user terminal 20.

Upon receiving such an event image, the user terminal 20 makes the terminal display unit 24 display an event screen (2) illustrated in FIG. 10. This event screen (2) includes the names and images of different types of food and operating buttons 51 for selecting the different types of food as the list of items.

While the event screen (2) is displayed on the terminal display unit 24, the player A determines desired food out of the different types of food included in the list of items, and selects an operating button 51 corresponding to the desired food.

When the player A selects the operating button 51 included in the event screen (2), the user terminal 20 transmits a command to designate the food desired by the player A to the server device 10. Upon receiving such a command, the server device 10 refers to the event information illustrated in FIG. 8 to determine whether or not the event that has occurred succeeds or fails based on the event success rate. At this time, whether or not the event succeeds or fails may be determined based on the type of the food desired by the player A. For example, the event success rate of an event may be set so that should the player A select a certain item, the server device 10 always determines that the event succeeds.

When the server device 10 determines that the event fails, the server device 10 generates an event image indicating that the item could not be obtained due to the failure of the event, and transmits the generated event image to the user terminal 20.

Upon receiving such an event image, the user terminal 20 makes the terminal display unit 24 display an event screen (3) illustrated in FIG. 10. This event screen (3) includes information indicating that the item could not be obtained and an operating button 52 for continuing the search.

When the player A selects the operating button 52 included in the event screen (3), the user terminal 20 transmits a command to request the continuation of the search to the server device 10. Upon receiving this command, the server device 10 performs a game process for restarting the game and conducting the search.

On the other hand, when the server device 10 determines that the event succeeds, the server device 10 generates an event image indicating that the item has been obtained due to the success of the event by referring to the item information illustrated in FIG. 7, and transmits the generated event image to the user terminal 20.

Upon receiving such an event image, the user terminal 20 makes the terminal display unit 24 display an event screen (4) illustrated in FIG. 10. This event screen (4) includes information indicating that the item could be obtained and an obtained item image 53.

When the player A selects the item image 53 included in the event screen (4), the user terminal 20 transmits a command to request the selection of the item to the server device 10. When the server device 10 receives this command through the reception unit 115, the server device 10 makes the image generation unit 117 generate an event image for notifying other players different from the player A that the character who emerged in the event has appeared, and transmits the generated event image to the user terminal 20.

Upon receiving such an event image, the user terminal 20 makes the terminal display unit 24 display an event screen (5) illustrated in FIG. 10. This event screen (5) includes information indicative of the character that has emerged in the event and an operating button 54 for notifying other players of the occurrence of the event (the appearance of the character).

When the player A selects the operating button 54 included in the event screen (5), the user terminal 20 transmits a command to request notification to other players to the server device 10. When the server device 10 receives this command through the reception unit 115, the server device 10 refers to the number determination information illustrated in FIG. 9 to determine the number of other players different from the player A based on the number of times the event has occurred. Next, the server device 10 refers to the user information illustrated in FIG. 5 to extract a plurality of friend users (e.g., the players B to F) associated with the player A. The server device 10 makes the image generation unit 117 generate an event image including information indicating that friend users (other players) corresponding to the determined number can be selected and the plurality of friend users extracted, and transmits the generated event image to the user terminal 20.

Upon receiving such an event image, the user terminal 20 makes the terminal display unit 24 display an event screen (6) illustrated in FIG. 10. This event screen (6) includes information indicating the number of selectable players, checkboxes 55 corresponding one-to-one to the plurality of friend users, and an operating button 56 for notifying friend users who have been selected through the checkboxes 55.

The player A can select friend users (other players) corresponding to the determined number from among the plurality of friend users by checking the corresponding checkboxes 55. It is assumed here that, as indicated on the event screen (6), the number of selectable friend users (other players) has been determined as one to three (three or less), and the player A selects two players, namely the players B and C from among the plurality of friend users.

When the player A checks the corresponding checkboxes 55 and selects the operating button 56 on the event screen (6), the user terminal 20 transmits a command to request notification to the selected players B and C to the server device 10. When the server device 10 receives this command through the reception unit 115, the server device 10 makes the image generation unit 117 generate an event image including character appearance information indicating that the character has appeared through the occurrence of the event for the player A, and transmits the generated event image to the user terminals 20 of the players B and C selected by the player A. The server device 10 also makes the image generation unit 117 generate an event image including information indicating that the notification of the character appearance information has been completed, and transmits the generated event image to the user terminal 20 of the player A.

Upon receiving such an event image, the user terminal 20 of the player A makes the terminal display unit 24 display an event screen (7) illustrated in FIG. 10. The player A can check that the notification of the character appearance information to the players B and C has been completed by looking at this event screen (7).

When the user terminals 20 of the players B and C receive the event image including the character appearance information transmitted from the server device 10, they notify the players B and C of the appearance of the character through the occurrence of the event for the player A by making the terminal display units 24 display the received event image.

When the character appearance information is notified to the players B and C in the above manner, an event for allowing the players B and C to obtain the item occurs consecutively after the event for allowing the player A to obtain the item. The following is a specific description of the screen transitions for the event that has occurred consecutively.

<Screen Transitions for Event that has Occurred Consecutively>

A description is now given of screen transitions for an event that has occurred consecutively with reference to FIGS. 11 to 13. Note that the following description is given under the assumption that event screens are displayed in sequence on the terminal display units 24 of the user terminals 20 used by other players (e.g., player B) selected by the player A.

When an event for allowing the player A to obtain an item occurs and the success of the event is determined, character appearance information is notified to the player B selected by the player A so as to cause consecutive occurrence of an event for allowing the player B to obtain the item.

The player B checks the character appearance information using the user terminal 20. When the user terminal 20 receives the event image including the character appearance information transmitted from the server device 10, the user terminal 20 makes the terminal display unit 24 display an event screen (1) illustrated in FIG. 11. The player B can acknowledge that the character appearance information has been delivered by looking at the event screen (1). This event screen (1) includes an operating button 60 for checking the character appearance information.

When the player B selects the operating button 60 included in the event screen (1), the user terminal 20 transmits a command to request confirmation of the character appearance information to the server device 10. When the server device 10 receives this command through the reception unit 115, the server device 10 makes the image generation unit 117 generate an event image indicative of specific contents of the character appearance information, and transmits the generated event image to the user terminal 20.

Upon receiving such an event image, the user terminal 20 makes the terminal display unit 24 display an event screen (2) illustrated in FIG. 11. This event screen (2) includes, as a list of character appearance information, the names of the players who have selected the player B as a target of notification, the names and images of characters that have appeared in events, and operating buttons 61 for receiving character information.

While the event screen (2) is displayed on the terminal display unit 24, the player B determines desired character appearance information out of the list of character appearance information, and selects an operating button 61 corresponding to the desired character appearance information. It is assumed here that the player B has selected the character appearance information notified from the player A.

When the player B selects the operating button 61 included in the event screen (2), the user terminal 20 transmits a command to request reception of the character appearance information to the server device 10. When the server device 10 receives this command through the reception unit 115, the server device 10 causes consecutive occurrence of an event for allowing the player B to obtain the item. In the present embodiment, this event that occurs consecutively is the same as the first event that allowed the player A to obtain the item. In other words, the event in which the character A appears occurs consecutively. Thereafter, the server device 10 generates an event image indicating that the character A has appeared, and transmits the generated event image to the user terminal 20.

As set forth above, in the case of an event that occurs consecutively, the server device 10 causes the occurrence of the event without fail as the server device 10 does not perform the process to determine whether or not to cause the occurrence of the event, unlike an event that occurs for the first time. This enables chained occurrences of an event for a plurality of players.

Note that an event that occurs consecutively may be different from the first event that allowed the player A to obtain an item.

Upon receiving such an event image, the user terminal 20 makes the terminal display unit 24 display an event screen (3) illustrated in FIG. 11. This event screen (3) includes the name and image of the character A that has appeared, and an operating button 62 for taking action toward the character A. In the present embodiment, the operating button 62 is a button for giving food to the character A.

When the player B selects the operating button 62 included in the event screen (3), the user terminal 20 transmits a command to request the giving of food to the character A to the server device 10. When the server device 10 receives this command through the reception unit 115, the server device 10 makes the image generation unit 117 generate an event image including a list of items by referring to the item information illustrated in FIG. 7, and transmits the generated event image to the user terminal 20.

Upon receiving such an event image, the user terminal 20 makes the terminal display unit 24 display an event screen (4) illustrated in FIG. 11. This event screen (4) includes the names and images of different types of food and operating buttons 63 for selecting the different types of food as the list of items.

While the event screen (4) is displayed on the terminal display unit 24, the player B determines desired food out of the different types of food included in the list of items, and selects an operating button 63 corresponding to the desired food.

When the player B selects the operating button 63 included in the event screen (4), the user terminal 20 transmits a command to designate the food desired by the player B to the server device 10. Upon receiving such a command, the server device 10 refers to the event information illustrated in FIG. 8 to determine whether or not the event that has occurred succeeds or fails based on the event success rate. At this time, whether or not the event succeeds or fails may be determined based on the type of the food desired by the player B. For example, the event success rate of an event may be set so that should the player B select a certain item, the server device 10 always determines that the event succeeds.

When the server device 10 determines that the event fails, the server device 10 generates an event image indicating that the item could not be obtained due to the failure of the event, and transmits the generated event image to the user terminal 20.

Upon receiving such an event image, the user terminal 20 makes the terminal display unit 24 display an event screen (5) illustrated in FIG. 12. This event screen (5) includes information indicating that the item could not be obtained and an operating button 52 for continuing the search.

When the player B selects the operating button 52 included in the event screen (5), the user terminal 20 transmits a command to request the continuation of the search to the server device 10. When the server device 10 receives this command, before performing the game process for continuing the search, the server device 10 generates an event image for sending a message from the selected player B to the player A and sends the generated event image to the user terminal 20.

Upon receiving such an event image, the user terminal 20 makes the terminal display unit 24 display an event screen (6) illustrated in FIG. 12. This event screen (6) includes a text box 64 for inputting a message and an operating button 65 for sending the input message.

The player B inputs a message for the player A into the text box 64 by operating the terminal input unit 23 of the user terminal 20. After completing the input of the message, the player B selects the operating button 65.

When the player B selects the operating button 65 included in the event screen (6), the user terminal 20 transmits a command to request the sending of the message input into the text box 64 to the server device 10. Upon receiving this command, the server device 10 performs a process for sending the message input into the text box 64 to the user terminal 20 of the player A. In this way, communication between players can be activated. Thereafter, the server device 10 performs a game process for restarting the game and conducting the search.

On the other hand, when the server device 10 determines that the event succeeds, the server device 10 generates an event image indicating that the item has been obtained due to the success of the event by referring to the item information illustrated in FIG. 7, and transmits the generated event image to the user terminal 20.

Upon receiving such an event image, the user terminal 20 makes the terminal display unit 24 display an event screen (7) illustrated in FIG. 13. This event screen (7) includes information indicating that the item could be obtained and an obtained item image 66.

When the player B selects the item image 66 included in the event screen (7), the user terminal 20 transmits a command to request selection of the item to the server device 10. When the server device 10 receives this command through the reception unit 115, the server device 10 makes the image generation unit 117 generate an event image for notifying other players different from the player B of the appearance of the character that has emerged in the event, and transmits the generated event image to the user terminal 20.

Upon receiving such an event image, the user terminal 20 makes the terminal display unit 24 display an event screen (8) illustrated in FIG. 13. This event screen (8) includes information indicative of the character that has emerged in the event and an operating button 67 for notifying other players of the occurrence of the event (the appearance of the character).

When the player B selects the operating button 67 included in the event screen (8), the user terminal 20 transmits a command to request notification to other players to the server device 10. When the server device 10 receives this command through the reception unit 115, the server device 10 refers to the number determination information illustrated in FIG. 9 to determine the number of other players different from the player B based on the number of times the event has occurred. Next, the server device 10 refers to the user information illustrated in FIG. 5 to extract a plurality of friend users (e.g., the players P to S) associated with the player B. The server device 10 makes the image generation unit 117 generate an event image including information indicating that friend users (other players) corresponding to the determined number can be selected and the plurality of friend users extracted, and transmits the generated event image to the user terminal 20.

Upon receiving such an event image, the user terminal 20 makes the terminal display unit 24 display an event screen (9) illustrated in FIG. 13. This event screen (9) includes information indicating the number of selectable players, checkboxes 68 corresponding one-to-one to the plurality of friend users, and an operating button 69 for notifying friend users who have been selected through the checkboxes 68. Note that the server device 10 may count the number of times each friend user has notified the player A of appearance information in the past, and display that number in association with the name of each friend user on the event screen (9). This makes it easy for the player A to provide appearance information to friend users who regularly notify the player A of appearance information. Furthermore, the order of displayed friend users may be changed based on the user information such as the amount of virtual currency spent by each friend user. This enables the game administrator to provide games with higher sociality with a focus on users who play the games at high frequency.

The player B can select friend users (other players) corresponding to the determined number from among the plurality of friend users by checking the corresponding checkboxes 68. It is assumed here that, as indicated on the event screen (9), the number of selectable friend users (other players) has been determined as only one, and the player B selects only the player P from among the plurality of friend users.

While the number of selectable friend users is three or less in the first event that occurred for the player A (see the event screen (6) illustrated in FIG. 10), the number of selectable friend users is only one in the event that occurred consecutively thereafter for the player B (see the event screen (9) illustrated in FIG. 11). In this way, the number of players for whom an event can occur consecutively is gradually restricted as the number of times the event has occurred increases. As a result, unlimited chained occurrences of the event can be suppressed.

When the player B checks the corresponding checkbox 68 and selects the operating button 69 on the event screen (9), the user terminal 20 transmits a command to request notification to the selected player P to the server device 10. When the server device 10 receives this command through the reception unit 115, the server device 10 makes the image generation unit 117 generate an event image including character appearance information indicating that the character has appeared through the occurrence of the event, and transmits the generated event image to the user terminal 20 of the player P selected by the player B. The server device 10 also makes the image generation unit 117 generate an event image including information indicating that the notification of the character appearance information has been completed, and transmits the generated event image to the user terminal 20 of the player B.

Upon receiving such an event image, the user terminal 20 of the player P makes the terminal display unit 24 display an event screen (1) illustrated in FIG. 11. The player P can acknowledge that the character appearance information has been delivered by looking at the event screen (1).

At this time, the user terminal 20 of the player P may limit a display time period of the event screen (1) illustrated in FIG. 11 to a predetermined time period. By thus setting a limited time period for display of the character appearance information, the player P actively checks the arrival of the character appearance information, thereby increasing the possibility of consecutive occurrences of the event.

In the above manner, when an event for allowing the player B to obtain an item occurs and the success of the event is determined, character appearance information is notified to the player P selected by the player B so as to cause chained occurrence of an event for allowing the player P to obtain the item.

Meanwhile, upon receiving such an event image, the user terminal 20 of the player B makes the terminal display unit 24 display an event screen (10) illustrated in FIG. 13. This event screen (10) includes information indicating that the notification of the character appearance information has been completed and an operating button 70 for proceeding to the next event screen. The player B can check that the notification of the character appearance information to the player P has been completed by looking at this event screen (10).

When the player B selects the operating button 70 included in the event screen (10), the user terminal 20 of the player B transmits a command to request the next event image to the server device 10. Upon receiving this command, the server device 10 generates an event image for sending a message from the selected player B to the player A, and transmits the generated event image to the user terminal 20 of the player B.

Upon receiving such an event image, the user terminal 20 of the player B makes the terminal display unit 24 display an event screen (11) illustrated in FIG. 13. This event screen (11) includes a text box 64 for inputting a message and an operating button 65 for sending the input message.

The player B inputs a message for the player A into the text box 64 by operating the terminal input unit 23 of the user terminal 20. After completing the input of the message, the player B selects the operating button 65.

When the player B selects the operating button 65 included in the event screen (11), the user terminal 20 of the player B transmits a command to request the sending of the message input into the text box 64 to the server device 10. Upon receiving this command, the server device 10 performs a process for sending the message input into the text box 64 to the user terminal 20 of the player A through the message sending unit 116. In this way, communication between players can be activated.

<<<Operation of Game System 1>>>

Figure 14:
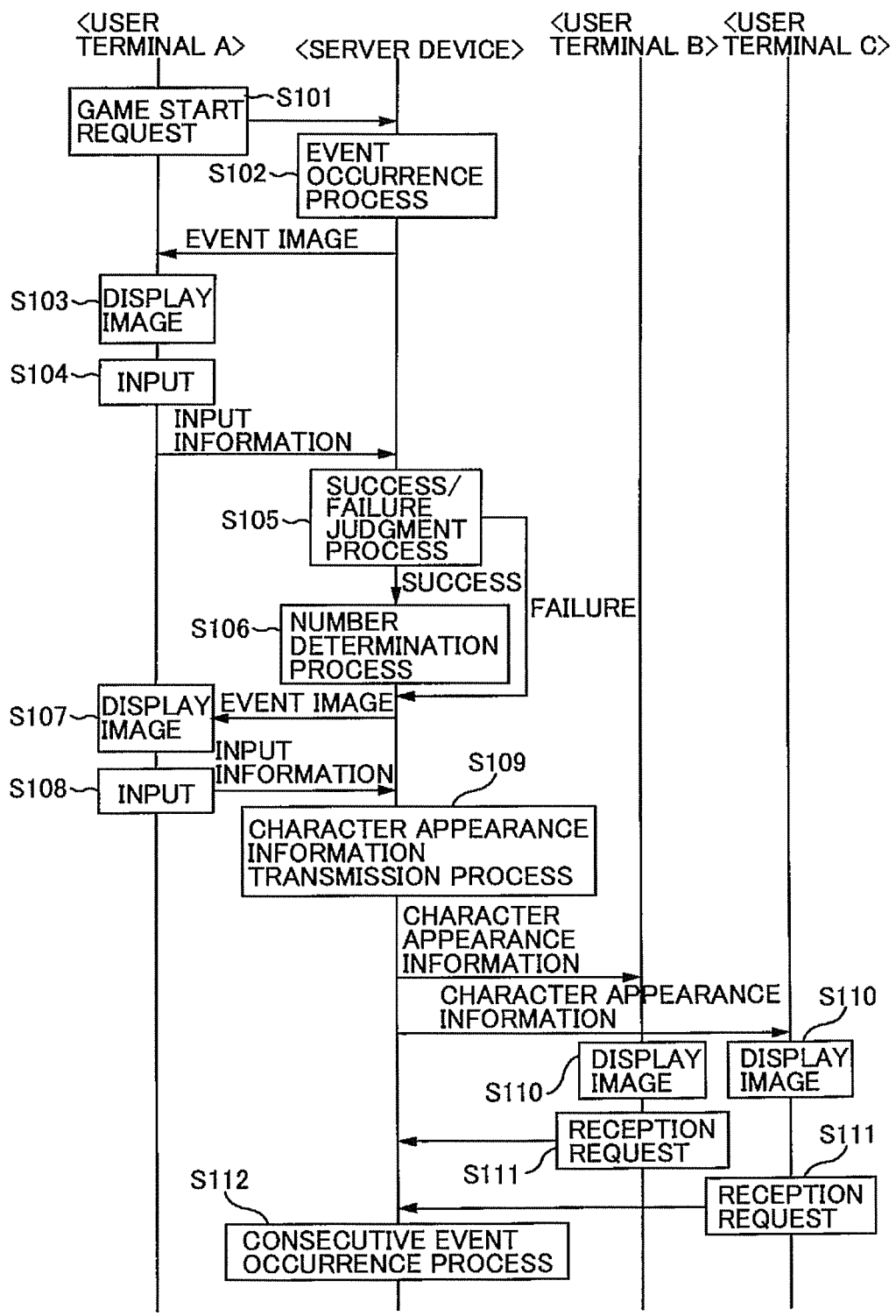
FIG. 14 is a flowchart describing an operation example of the game system 1 according to the present embodiment.

The following describes an overall operation of the game system 1 with reference to FIG. 14. FIG. 14 is a flowchart describing an operation example of the game system 1 according to the present embodiment. Note that in the game system 1 according to the present embodiment, the units are controlled and the processes are performed by making the server device 10 and the user terminals 20 cooperate based on a game program.

In the following description, it is assumed that a user terminal 20 used by a player A (player) is a user terminal A, and user terminals 20 used by players B and C (other players) are user terminals B and C, respectively.

First, the player A issues a start request for starting a battle-type card game by operating the user terminal A (S101). Specifically, a web page accessed by the player A for starting the battle game is displayed on the terminal display unit 24 of the user terminal A and the battle-type card game is started by the player A operating the terminal input unit 23. That is to say, when the terminal control unit 21 receives an operational input signal to start the game from the terminal input unit 23, the terminal control unit 21 associates the user ID with a command (game start request) to start the battle game and transmits the command to the server device 10 through the terminal communication unit 25.

When the server device 10 receives this game start request, the server device 10 starts a game process for the battle-type card game, and performs an event occurrence process to cause occurrence of an event for allowing the player A to obtain an item as a result of conducting a search (S102). Specifically, the event occurrence unit 111 randomly determines the type of an event to occur during the progress of the game, and determines whether or not to cause the determined event to occur based on the event occurrence probability (see FIG. 8) associated with the determined event.

When the server device 10 determines to cause the event to occur, the server device 10 makes the image generation unit 117 generate an event image. The server device 10 then transmits the event image generated by the image generation unit 117 to the user terminal A through the communication unit 15.

Upon receiving the event image transmitted from the server device 10, the user terminal A makes the terminal display unit 24 display the received event image (S103) and receives an operational input from the player A (S104). Specifically, when the terminal control unit 21 receives the operational input from the player A from the terminal input unit 23, the terminal control unit 21 associates the user ID with a command to request determination as to whether or not the event that has occurred succeeds or fails, and transmits the command to the server device 10 through the terminal communication unit 25.

When the server device 10 receives this command, the server device 10 performs a judgment process for judging whether or not the event that has occurred succeeds or fails (S105). Specifically, the control unit 11 determines whether or not the event that has occurred succeeds or fails based on the event success rate (see FIG. 8) associated with the event that has occurred. When the control unit 11 determines that the event succeeds, the control unit 11 performs a provision process to determine an item based on the provided item ID (see FIG. 8) associated with the event that has occurred and provide the determined item to the player A. In this way, an item is provided only when an event succeeds. As a result, the distribution of the item can be suppressed.

Thereafter, in order to cause an event for allowing other players different from the player A to obtain the item to occur in a consecutive manner after the event for allowing the player A to obtain the item, the server device 10 performs a number determination process to determine the number of other players (S106). Specifically, the occurrence count acquisition unit 112 first acquires the number of repetitions of the event for allowing the player A to obtain the item (the number of times the event has occurred) by reading the same from the memory. Then, the number determination unit 113 identifies the probability corresponding to the number of repetitions of the event (the number of times the event has occurred) acquired by the occurrence count acquisition unit 112 by referring to the number determination information illustrated in FIG. 9, and determines the number of other players for whom the event can occur consecutively based on the identified probability. For example, in the present embodiment, as illustrated in FIG. 9, when the number of repetitions of the event for allowing the player A to obtain the item is one, the number of other players for whom the event can occur consecutively is determined as one, two or three based on the probability corresponding to the case where the number of repetitions is one. When the number of repetitions is two, the number of other players for whom the event can occur consecutively is determined as only one based on the probability corresponding to the case where the number of repetitions is two. When the number of repetitions reaches five, the number of other players is determined as zero, and the consecutive occurrences of the event are ended.

When the number of other players for whom the event can occur consecutively is determined as one or more, the server device 10 extracts a plurality of friend users associated with the player A by referring to the user information illustrated in FIG. 5, makes the image generation unit 117 generate an event image including the plurality of friend users extracted and information indicating that friend users corresponding to the number determined by the number determination unit 113 or less can be selected, and transmits the generated event image to the user terminal 20.

Upon receiving the event image transmitted from the server device 10, the user terminal A causes the terminal display unit 24 to display the received event image (S107) and receives an operational input from the player A (S108). Specifically, when the terminal control unit 21 receives the operational input from the player A from the terminal input unit 23, the terminal control unit 21 transmits a command to request consecutive occurrence of the event for the friend users selected by the player A to the server device 10 through the terminal communication unit 25. It is assumed here that the player A has selected the players B and C.

When the server device 10 receives this command through the reception unit 115, the server device 10 makes the image generation unit 117 generate an event image including character appearance information indicating that a character has appeared through the occurrence of the event, and performs a character information transmission process to transmit the generated event image to the user terminal B of the player B and the user terminal C of the player C (S109).

The server device 10 sets the consecutive event occurrence information associated with the user IDs of the players B and C to "two" (see FIG. 5). As a result, this consecutive event occurrence information is referred to in the aforementioned number determination process (S106), and the player A is set as the player who has notified the event (see FIG. 5).

The user terminal B of the player B and the user terminal C of the player C receive the event image including the character appearance information transmitted from the server device 10, and cause the terminal display units 24 to display the received event image. As a result, the players B and C are notified that the character has appeared through the occurrence of the event (S110).

Next, the user terminal B of the player B or the user terminal C of the player C transmits a command to request reception of the character appearance information to the server device 10 in accordance with an operational input from the player B or the player C (S111).

Upon receiving this command, the server device 10 performs a consecutive event occurrence process for causing an event for allowing the player B (or the player C) to obtain the item to occur in a consecutive manner after the event for allowing the player A to obtain the item through the consecutive event generation unit 114 (S112). When the event for allowing the player B (or the player C) to obtain the item has occurred consecutively, the message sending unit 116 performs a message sending process for sending a message from the player B (or the player C) for whom the event has occurred consecutively through the consecutive event generation unit 114, to the player A for whom the event has occurred through the event occurrence unit 111.

As has been described above, according to the game system 1 of the present embodiment, when causing an event for allowing other players (players B and C) different from a player (player A) to obtain an item to occur in a consecutive manner after an event for allowing the player to obtain the item, the number of other players is determined based on the number of times the event has occurred. This can restrict successive occurrences of the opportunity where a plurality of players can obtain the item, thereby suppressing an increase in the distribution of the item.

Other Embodiments

The present embodiment facilitates understanding of the present invention and does not intend to limit the interpretation of the present invention. Variations and modifications may be made in accordance with the spirit and scope of the present invention and equivalents thereof are included in the present invention.

The present embodiment has described the game system 1 including one server device 10 as an example. However, the present invention is not limited in this way. A plurality of server devices may be connected via a network, and each server device may execute various types of distributed processing.

The present embodiment has described an example in which the game system 1 performs various processes such as the event occurrence process, the occurrence count acquisition process, the number determination process and the consecutive event occurrence process by making the server device 10 and the user terminals 20 cooperate based on a game program. However, the present invention is not limited in this way. Each user terminal 20 or the server device 10 may individually perform these processes based on the game program as an information processing device.

Although the present embodiment has described screen transitions for the case where an event that has occurred consecutively succeeds with reference to FIG. 13, the present invention is not limited in this way. For example, the event screens illustrated in FIG. 13 may be displayed on the terminal display unit 24 in the order of (7), (11), (8), (9), and (10). That is to say, when the success of the event that has occurred consecutively is determined, the message sending unit 116 may send a message from other players (e.g., the player B) for whom the event has occurred consecutively through the consecutive event generation unit 114 to a player (e.g., the player A) for whom the event has occurred through the event occurrence unit 111. The timing for sending the message is not limited to the one in the screen transitions illustrated in FIG. 13.

What is claimed is:

1. A non-transitory computer-readable storage medium in an electronic game system with a game program stored thereon, the electronic game system comprising a server device and a plurality of user terminals connected to a network, the game program instructing the electronic game system to perform the following processes:
   an event occurrence process to cause occurrence of an event for allowing a player to obtain an item based on event information stored in a storage unit;
   a number determination process (1) to refer to number determination information in which a number of other players for whom an event is able to occur consecutively and a probability corresponding to the number of other players for whom an event is able to occur consecutively is set based on an event type and a number of event repetitions for the event type and (2) to determine the number of other players in accordance with the event type and the number of event repetitions for allowing the player to obtain an item, the number determination information being stored in the storage unit; and
   a consecutive event occurrence process to cause an event for allowing players to obtain an item to occur, based on the event information, in a consecutive manner after the event for allowing the player to obtain the item, the number of the players being a number determined by the number determination process or less.

2. A non-transitory computer-readable storage medium according to claim 1, wherein
   the game program causes the electronic game system to execute a reception process to receive inputs from the player for selecting the other players, the number of the inputs being smaller than or equal to the number determined in the number determination process, and
   in the consecutive event occurrence process, cause an event for allowing the other players selected based on the inputs received by the reception process to obtain an item to occur in a consecutive manner after the event for allowing the player to obtain the item.

3. A non-transitory computer-readable storage medium according to claim 1, wherein
   when the consecutive event occurrence process has caused consecutive occurrence of the event for allowing the other players to obtain the item, the game program causes the electronic game system to execute a message sending process to send a message from the other players to the player.

4. A non-transitory computer-readable storage medium according to claim 1, wherein
   the game program causes the electronic game system to execute
   a judgment process to judge whether the event that has been caused to occur in the event occurrence process succeeds or fails; and
   a provision process to provide the item to the player when the judgment process has judged that the event succeeds.

5. An information processing device comprising:
   an event occurrence unit that causes occurrence of an event for allowing a player to obtain an item based on event information stored in a storage unit;
   a number determination unit that (1) refers to number determination information in which a number of other players for whom an event is able to occur consecutively and a probability corresponding to the number of other players for whom an event is able to occur consecutively is set based on an event type and a number of event repetitions for the event type and (2) determines the number of other players in accordance with the event type and the number of event repetitions for allowing the player to obtain an item, the number determination information being stored in the storage unit; and
   a consecutive event occurrence unit that causes an event for allowing players to obtain an item to occur, based on the event information, in a consecutive manner after the event for allowing the player to obtain the item, the number of the players being a number determined by the number determination unit or less.

6. A game server device in an electronic game system, the server device being connected to a plurality of user terminals in the electronic game system via a network, the server device being configured to:
   cause occurrence of an event for allowing a player to obtain an item based on event information stored in a storage unit;
   refer to number determination information in which a number of other players for whom an event is able to occur consecutively and a probability corresponding to the number of other players for whom an event is able to occur consecutively is set based on an event type and a number of event repetitions for the event type;
   determine the number of other players in accordance with the event type and the number of event repetitions for allowing the player to obtain an item, the number determination information being stored in the storage unit; and
   cause an event for allowing players to obtain an item to occur, based on the event information, in a consecutive manner after the event for allowing the player to obtain the item, the number of the players being a number determined by the number determination process or less.

* * * * *